United States Patent [19]

Babbitt et al.

[11] Patent Number: 5,555,108

[45] Date of Patent: Sep. 10, 1996

[54] HOLOGRAPHIC EXPOSURE PRISM

[75] Inventors: Stephen T. Babbitt, Redondo Beach; James E. Scott, Hermosa Beach; John E. Wreede, Azusa, all of Calif.

[73] Assignee: Hughes Electronics, Los Angeles, Calif.

[21] Appl. No.: 298,810

[22] Filed: Aug. 31, 1994

[51] Int. Cl.$^6$ .............. G03H 1/20; G03H 1/26; G03H 1/00; G02B 5/32
[52] U.S. Cl. .............. 359/12; 359/15; 359/22; 359/30
[58] Field of Search .............. 359/12, 22, 24, 359/25, 30

[56] References Cited

U.S. PATENT DOCUMENTS

| | | | |
|---|---|---|---|
| 3,752,557 | 8/1973 | Belvaux | 359/12 |
| 3,758,186 | 9/1973 | Brumm | 359/12 |
| 4,720,158 | 1/1988 | Kuwayama et al. | 359/12 |
| 4,790,612 | 12/1988 | Dickson | 359/12 |
| 4,857,425 | 8/1989 | Phillips | 359/12 |
| 4,895,419 | 1/1990 | Doyle et al. | 359/12 |
| 4,904,033 | 2/1990 | Ikeda et al. | 359/12 |
| 4,953,923 | 9/1990 | Wreede | 359/30 |
| 4,960,311 | 10/1990 | Moss et al. | 359/12 |
| 5,003,386 | 3/1991 | Doyle et al. | 359/30 |
| 5,128,780 | 7/1992 | Smith | 359/24 |
| 5,272,550 | 12/1993 | Dickson et al. | 359/15 |
| 5,322,747 | 6/1994 | Hugle | 359/12 |

FOREIGN PATENT DOCUMENTS

| | | | |
|---|---|---|---|
| 1-68785 | 3/1989 | Japan | 359/12 |
| 2-109086 | 4/1990 | Japan | 359/12 |
| 5-341703 | 12/1993 | Japan | 359/12 |

*Primary Examiner*—Paul M. Dzierzynski
*Assistant Examiner*—Audrey Chang
*Attorney, Agent, or Firm*—Leonard A. Alkov; Wanda K. Denson-Low

[57] ABSTRACT

A hologram exposure system that includes a holographic recording medium, a holographic prism adjacent the holographic recording medium for most efficiently diffracting light of a predetermined wavelength and at a predetermined incidence angle, a first monochromatic beam directed toward the holographic prism at the predetermined incidence angle, and a second monochromatic beam directed toward the holographic prism at an incidence angle that allows the second monochromatic beam to be transmitted by the holographic prism without any diffraction. The holographic prism diffracts the first monochromatic beam and transmits the second monochromatic beam without any diffraction to produce a diffracted first construction beam and a non-diffracted second construction beam which interfere in the holographic recording medium to form holographic fringes therein. The exposure system further includes a holographic zero order filter interposed between the holographic prism and the holographic recording material for diffracting away from the holographic recording medium a portion of the first monochromatic beam that is not diffracted by the holographic prism.

12 Claims, 2 Drawing Sheets

HOLOGRAPHIC EXPOSURE PRISM

BACKGROUND OF THE INVENTION

The disclosed invention is directed generally to holographic exposure systems, and more particularly to a holographic exposure system that includes a holographic prism for efficiently coupling a hologram constructing beam to a hologram recording layer.

Holographic exposures generally involve two coherent construction beams that are directed to a holographic recording medium in which the beams constructively interfere. Pursuant to factors such as reconstruction angle, reconstruction wavelength, viewing angle, and construction wavelength, a relatively large angle of incidence relative to normal for one or both of the construction beams is frequently required. While the simplest way of achieving a relatively large angle of incidence is to direct a construction beam to the hologram recording layer at the relatively large angle, coupling of the beam into the hologram recording layer decreases as angle of incidence increases. A common technique for coupling a construction beam of relatively large incidence angle, particularly if the desired angle in the hologram recording layer is greater than the critical angle, is to use an appropriately shaped prism having an entrance facet that provides a relatively small angle of incidence for the construction beam and another facet that is index matched to the holo-gram recording layer and through which the construction beam exits at a relatively large angle relative to normal to the hologram recording layer. The other construction beam will typically also be coupled to the hologram recording layer by the prism, for example, by a separate entrance facet or the same entrance facet utilized for the other construction beam, in which case the angle of the entrance facet may be compromised so as to be non-optimum for both beams. The prism can be a glass or plastic prism, or it can be a glass tank filled with fluid.

Considerations with the use of refractive prisms to couple construction illumination to a hologram recording medium include the fact that a glass prism can be large and therefore expensive, limitations on exposure system design that may be imposed by the physical size of a refractive prism, as well as the inconvenience of utilizing a large prism. Moreover, large fluid filled prisms tend to have striation problems, and large glass prisms can have birefringence problems.

SUMMARY OF THE INVENTION

It would therefore be an advantage to provide a hologram exposure system that includes a compact optical element for coupling construction illumination to a hologram recording medium.

The foregoing and other advantages are provided by the invention in a hologram exposure system that includes a holographic recording medium, a holographic prism adjacent the holographic recording medium and configured to be most efficient at diffracting light having a predetermined wavelength and a predetermined incidence angle, a first monochromatic beam of the predetermined wavelength and directed toward the holographic prism at the predetermined incidence angle, and a second monochromatic beam coherent with the first monochromatic beam and directed toward the holographic prism at an incidence angle that causes the second monochromatic beam to be transmitted by the holographic prism with substantially no diffraction. The holographic prism thus diffracts the first monochromatic beam and transmits the second monochromatic beam without diffraction to produce a diffracted first construction beam and a non-diffracted second construction beam which interfere in the holographic recording medium to form holographic fringes therein.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
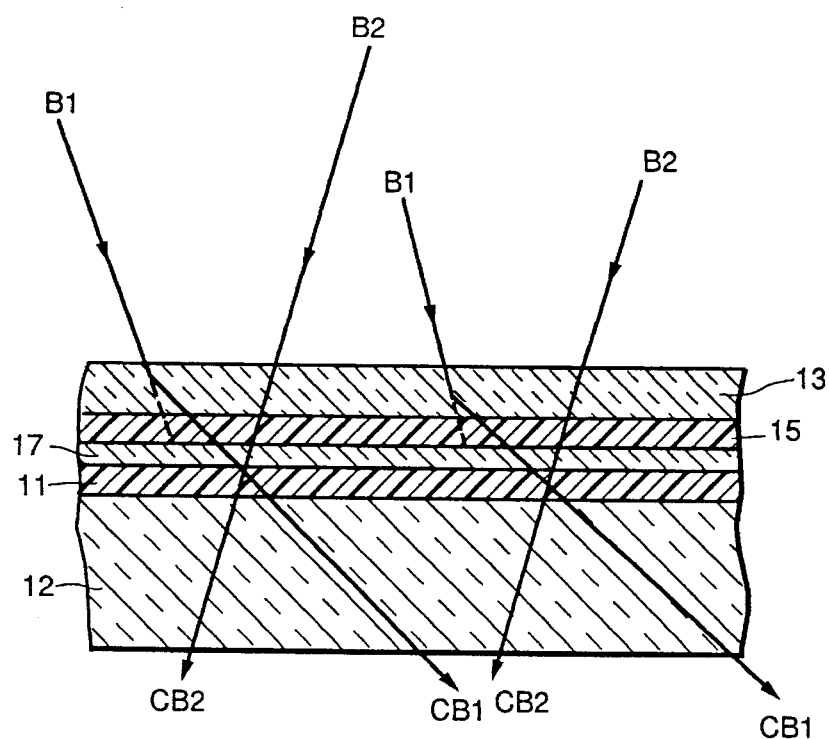
FIG. 1 schematically depicts a hologram exposure system in accordance with the invention.

In the following detailed description and in the several figures of the drawing, like elements are identified with like reference numerals.

Referring now to FIG. 1, set forth therein is a schematic depiction of a hologram exposure system that includes a holographic prism in accordance with the invention. The exposure system includes a holographic recording medium 11 that is supported by a substrate 12, a laminar structure comprised of a holographic zero order filter 15 and a holographic prism 13 laminated together, and an index matching fluid layer 17 for index matching the laminar structure of the holographic prism and the holographic zero order filter to the holographic recording medium 11, wherein the holographic zero order filter is immediately contiguous to the index matching fluid layer. In accordance with the invention, the holographic prism 13 comprises a narrow angular bandwidth transmission hologram which is tuned to most efficiently diffract light of a predetermined wavelength and incident on the hologram at a predetermined incidence angle, and to diffract such light at a predetermined diffraction angle that corresponds to the desired angle at which a construction beam is to be coupled into the hologram recording medium 11. For ease of reference, such predetermined wavelength and predetermined incidence angle is herein called the Bragg condition, in accordance with the known Bragg equation which is a specific form of the optical grating equation that describes the operation of a hologram relative to the predetermined wavelength and the predetermined incidence angle at which it diffracts most efficiently. Effectively, a hologram is most efficient when the reconstruction beam emulates one of the construction beams, and thus the Bragg condition can be satisfied by two beams, both of which have the same incidence angle relative to normal to the fringes, although the two beams are on opposite sides of the hologram fringes. It should be appreciated that the diffraction angle for a particular incidence angle that satisfies the Bragg condition of a hologram corresponds to the other incidence angle that satisfies the Bragg condition of the hologram. It should also be appreciated that the two incidence angles that satisfy the Bragg condition are symmetrical about the fringes while in the hologram medium but may not appear so in air, which is typically the manner in which incidence angles are measured. In accordance with conventional knowledge in the art, a hologram will diffract light which (1) is of the predetermined wavelength that satisfies the Bragg condition and (2) is within two ranges of incidence angles that include the two incidence angles that satisfy the Bragg condition, although diffraction at an angle that does not satisfy the Bragg condition will not be as efficient as diffraction of light at an incidence angle that satisfies the Bragg condition. Such ranges of incidence angles over which a hologram diffracts light of the predetermined wavelength shall herein be called the angular bandwidth of a hologram. Light of the predetermined wavelength that would satisfy the Bragg condition if incident at a correct angle but which is outside the angular bandwidth of the hologram will be transmitted without any diffraction by the hologram, and in the following disclosure when a hologram is described as being configured to transmit a beam without any diffraction, the bandwidth of the hologram and/or the beam to be transmitted without any diffraction are configured such that the beam is outside the angular bandwidth of the hologram.

Depending on the actual angles of the beams in the exposure system, the holographic prism 13 is constructed to have an angular bandwidth that is sufficiently narrow to minimize diffraction of the other construction beam, as more specifically described further herein. Also, the holographic prism 13 is preferably constructed to have an efficiency that is as high as practicable so as to maximize the diffracted construction illumination that is coupled into the hologram recording material. For the illustrative example of a holographic prism 13 having a relatively narrow angular bandwidth and high efficiency, the holo-graphic prism 13 can have thickness in the range of about 20 to 40 microns.

A first monochromatic beam B1 having a wavelength and a direction that satisfies the Bragg condition of the holographic prism 13 is directed to the holographic prism 13, while a second monochromatic beam B2 which is coherent with the first monochromatic beam is directed at the holographic prism at a direction that allows the second monochromatic beam to be transmitted by the holographic prism with no diffraction. In particular, it is intended that the second monochromatic beam B2 be transmitted by the holographic prism without any diffraction, and thus the second monochromatic beam B2 and the angular bandwidth of the holographic prism 13 are configured such that the second monochromatic beam B2 is outside the angular bandwidth of the holographic prism 13.

Since the first monochromatic beam B1 meets the Bragg condition for the holographic prism, the holographic prism diffracts the first monochromatic beam B1 to produce a first construction beam CB1 which pursuant to the invention can be at a relatively high angle relative to normal to the hologram recording medium 11. Since the second monochromatic beam B2 is not within the angular bandwidth of the holographic prism 13, the holographic prism transmits the second monochromatic beam B2 without any diffraction to produce a second construction beam CB2. The holographic zero order filter 15 is configured to transmit without any diffraction the construction beam CB1 which resulted from diffraction by the holographic prism, and the construction beam CB2 which resulted from transmission without any diffraction by the holographic prism. The construction beams CB1, CB2 thus pass through the holographic zero order filter 15 without any diffraction into the hologram recording medium 11 where they interfere to form hologram fringes.

The holographic zero order filter 15 is further configured to diffract away from the hologram recording medium the portion of the beam B1 that is transmitted without any diffraction by the holographic prism, which is the result of the fact that transmission holograms cannot be 100 percent efficient, and comprises by way of illustrative example a reflection hologram. Such zero order transmission, schematically depicted by broken lines in FIG. 1, would otherwise interfere with other beams in the holographic recording layer to form unwanted noise holograms. The diffraction angle of the holographic zero order filter 15 is particularly selected to insure that the light diffracted thereby away from the hologram recording medium is not re-directed toward the holographic recording medium as a result of subsequent diffractions by the one or more of the holographic elements in the hologram exposure system. Thus, the holographic zero order filter 15 is constructed to have the same Bragg condition as the holographic prism 13, except that the holographic zero order filter 15 diffracts the transmitted, non-diffracted zero order portion of the beam B1 away from the hologram recording medium at a diffraction angle that will not cause the diffracted light to be diffracted toward the holographic recording medium by the overlying holographic prism 13. Moreover, the angular bandwidth of the holographic zero order filter 15 is configured such that the second monochromatic beam B2 and the diffracted construction beam CB1 are outside the angular bandwidth of the holographic zero order filter 15. By way of particular example, the holographic zero order filter 15 is configured to diffract the transmitted, non-diffracted zero order portion of the beam B1 back through the holographic prism. Although not shown, a cover with an anti-reflection coating can be positioned over the holographic prism 13 in accordance with conventional techniques to minimize reflection of the beam reflected back by the holographic zero order filter 15. Alternatively, the holographic zero order filter 15 can be configured to diffract the transmitted, non-diffracted portion of the beam B1 through the holographic zero order filter 15 so that the diffracted light exits at an edge of the holographic zero order filter 15, in which case a beam dump coating (not shown) can be disposed on the edges of the holographic zero order filter in accordance with conventional techniques.

The holographic zero order filter 15 can be omitted in those applications wherein the noise holograms formed by the transmitted, non-diffracted zero order portion of the beam B1 are acceptable, for example, wherein the noise holograms do not remove an objectionable amount of light from the primary image and the light diffracted by the noise holograms is not visible at the desired viewing position for the primary image.

Figure 2:
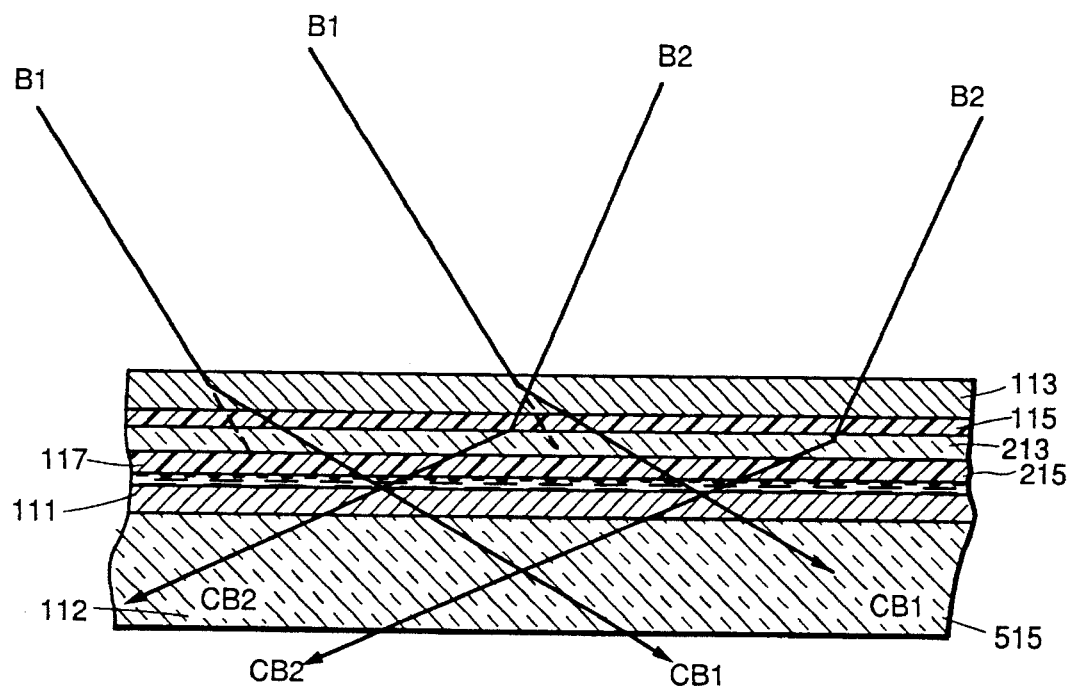
FIG. 2 schematically depicts a hologram exposure system in accordance with the invention which includes two holographic prisms.

Referring now to FIG. 2, set forth therein is a further illustrative implementation of an exposure system in accordance with the invention wherein both hologram forming construction beams are coupled into a hologram recording medium by respective holographic prisms. The exposure system includes a hologram recording medium 111 which is supported by a substrate 112, a laminar structure comprised of a first holographic prism 113, a first holographic zero order filter 115, a second holographic prism and a second holographic zero order filter 215 which are laminated together, and an index matching fluid layer 117 for index matching the laminar structure comprised of the holographic prisms and the holographic zero order filters to the holographic recording medium 111. More particularly, the layers of the laminar structure are in the following order, starting with the layer that is furthest from the index matching fluid layer 117: the first holographic prism 113, the first guard reflection hologram 115, the second holographic prism 213, and the second holographic zero order filter 215. Alternatively, the first and second holographic prisms can be positioned contiguously to each other, such that the first and second holographic zero order filters are positioned contiguously to each other, in which case the holographic zero order filters are located closest to the index matching fluid layer 117. The first and second holographic prisms 113, 213 and the first and second holographic zero order filters 115, 215, whether arranged in alternating prism/guard layers or in prism/prism and guard/guard layers, can be non-laminated and index matched to each other by respective intervening index matching fluid layers.

In accordance with the invention, the first holographic prism 113 comprises a narrow angular bandwidth transmission hologram which is tuned to diffract light of a predetermined wavelength and incidence angle that satisfies the Bragg condition thereof at a predetermined diffraction angle that corresponds to the desired angle at which a first construction beam is to be coupled into the hologram recording medium 111. The second holographic prism 213 similarly comprises a narrow angular bandwidth transmission hologram which is tuned to diffract light of a predetermined wavelength and incidence angle that satisfies the Bragg condition thereof at a predetermined diffraction angle that corresponds to the desired angle at which a second construction beam is to be coupled into the hologram recording medium 111.

As more particularly shown in FIG. 2, the first holographic prism 113 is tuned to diffract a first monochromatic beam B1 having a wavelength and a direction that satisfies the Bragg condition of the first holographic prism 113, and to transmit without any diffraction a second monochromatic beam B2 having the same wavelength as the first monochromatic beam B1 and a direction that satisfies the Bragg condition of the second holographic prism 213. The Bragg condition of the second holographic prism 213 is more particularly selected such that the diffracted output of the first holographic prism 113 is transmitted without any diffraction. Thus, the second monochromatic beam B2 and the angular bandwidth of the first holographic prism are configured such that the second monochromatic beam B2 is outside the angular bandwidth of the first holographic prism 113, and the angular bandwidth of the second holographic prism 213 is configured such that the diffracted output of the first holographic prism is outside of the angular bandwidth of the second holographic prism 213. To the extent that the hologram exposure system is implemented with the first and second holographic prisms next to each other, the first monochromatic beam B1 and the angular bandwidth of the second holographic prism 213 are configured such that the first monochromatic beam B1 is outside the angular bandwidth of the second holographic prism 115, whereby the portion of the first monochromatic beam B1 that is transmitted by the first holographic prism without any diffraction is transmitted without any diffraction by the second holographic prism. As described further herein, the first holographic zero order filter 115 is configured to diffract away from the hologram recording medium the portion of the first monochromatic beam B1 that is not diffracted by the first holographic prism 113.

Depending on the actual angles of the beams in the exposure system, the first and second holographic prisms are constructed to have respective angular bandwidths that are sufficiently narrow to so as to minimize diffraction of the beams that are to be transmitted without any diffraction. Also, the holographic prisms are preferably constructed to have efficiencies that are as high as practicable so as to maximize the diffracted construction illumination that is coupled into the hologram recording material. For the illustrative example of holographic prisms having relatively narrow angular bandwidths and high efficiency, each of the first and second holographic prisms 113, 213 can have thickness in the range of about 20 to 40 microns.

Since the first monochromatic beam B1 meets the Bragg condition for the first holographic prism, the first holographic prism 113 diffracts the first monochromatic beam B1 to produce a first construction beam CB1 which pursuant to the invention can be at a relatively high angle relative to normal to the hologram recording medium 111. Since the second monochromatic beam B2 is not within the angular bandwidth of the first holographic prism 113, the first holographic prism transmits the second monochromatic beam B2 without any diffraction. The first holographic zero order filter 115 is configured to transmit without any diffraction the construction beam CB1 which resulted from diffraction by the first holographic prism 113, and to transmit without any diffraction the second monochromatic beam B2 transmitted without any diffraction by the first holographic prism 113. Thus, the first construction beam CB1 and the second monochromatic beam B2 pass through the first holographic zero order filter 115 without any diffraction into the second holographic prism 213.

Since the second monochromatic beam B2 meets the Bragg condition for the second holographic prism 213, the second holographic prism diffracts the second monochromatic beam B2 to produce a second construction beam CB2 which pursuant to the invention can be at a relatively high angle relative to normal to the hologram recording medium 111. Since the first diffracted construction beam CB1 is not within the angular bandwidth of the second holographic prism 213, the second holographic prism transmits the first construction beam CB1 without any diffraction. The second holographic zero order filter 215 is configured to transmit without any diffraction the first construction beam CB1 which resulted from diffraction by the first holographic prism 113 and to transmit without any diffraction the second construction beam CB2 which resulted from diffraction by the second holographic prism 213. Thus, the construction beams CB1, CB2 pass through the second holographic zero order filter 215 without any diffraction and through the index matching fluid layer 117 into the hologram recording medium 111 where they interfere to form hologram fringes.

To the extent that the hologram exposure system is implemented with the first and second holographic zero order filters 115, 215 next to each other, the first holographic zero order filter is also configured to transmit the second diffracted construction beam CB2 without any diffraction.

The first holographic zero order filter 115 is further configured to diffract away from the hologram recording medium the portion of the monochromatic beam B1 that is transmitted without any diffraction by the first holographic prism 113, particularly at a diffraction angle that insures that the light diffracted thereby is not re-directed toward the holographic recording medium as a result of subsequent diffractions by the one or more of the holographic elements in the hologram exposure system. The second holographic zero order filter 215 is further configured to diffract away from the hologram recording medium 111 the portion of the monochromatic beam B2 that is transmitted without any diffraction by the second holographic prism 213, particularly at a diffraction angle that insures that the light diffracted thereby is not re-directed toward the holographic recording medium as a result of subsequent diffractions by the one or more of the holographic elements in the hologram exposure system. By way of illustrative example, each of the first and second holographic zero order filters 115, 215 comprises a reflection hologram.

Thus, the first holographic zero order filter 115 is constructed to have the same Bragg condition (wavelength and angle) as the first holographic prism 113, except that the first holographic zero order filter 115 diffracts the transmitted, non-diffracted zero order portion of the beam B1, schematically depicted in FIG. 2 by broken lines, away from the hologram recording medium 111 at an angle that insures that the light diffracted thereby is not re-directed toward the holographic recording medium as a result of subsequent diffractions by the one or more of the holographic elements in the hologram exposure system. Moreover, the angular bandwidth of the first holographic zero order filter 115 is configured such that the second monochromatic beam B2 and the construction beam CB1 are outside of the angular bandwidth of the first holographic zero order filter 115. To the extent that the hologram exposure system is implemented with first and second holographic zero order filters next to the each other, the angular bandwidth of the first holographic zero order filter would be further configured such that the second construction beam CB2 is outside the angular bandwidth of the first holographic zero order filter. By way of particular example, the first holographic zero order filter 115 is configured to diffract the transmitted, non-diffracted zero order portion of the beam B1 back through the first holographic prism 113. Alternatively, the first holographic zero order filter 115 is configured to diffract the transmitted, non-diffracted portion of the beam B1 through the first holographic zero order filter 115 so that the diffracted light exits at an edge of the first holographic zero order filter 115.

In similar manner, the second holographic zero order filter 215 is constructed to have the same Bragg condition as the second holographic prism 213, except that the second holographic zero order filter 215 diffracts the transmitted, non-diffracted zero order portion of the beam B2, schematically depicted in FIG. 2 by broken lines, away from the hologram recording medium 111 at an angle that insures that the light diffracted thereby is not re-directed toward the holographic recording medium as a result of subsequent diffractions by the one or more of the holographic elements in the hologram exposure system. Moreover, the angular bandwidth of the second holographic zero order filter 215 is configured such that the construction beams CB1, CB2 are outside of the angular bandwidth of the second holographic zero order filter 215. By way of particular example, the second holographic zero order filter 215 is configured to diffract the transmitted, non-diffracted zero order portion of the beam B2 back through the holographic prisms. Alternatively, the second holographic zero order filter 215 is configured to diffract the transmitted, non-diffracted portion of the beam B2 through the second holographic zero order filter 215 so that the diffracted light exits at an edge of the second holographic zero order filter 215.

One or both of the first and second holographic zero order filters 115,215 can be omitted in those applications wherein the noise holograms formed by the transmitted, non-diffracted zero order portions of the beams B1 and/or B2 are acceptable, for example, wherein the noise holo-grams do not remove an objectionable amount of light from the primary image and the light diffracted by the noise holograms is not visible the desired viewing position for the primary image.

Figure 3:
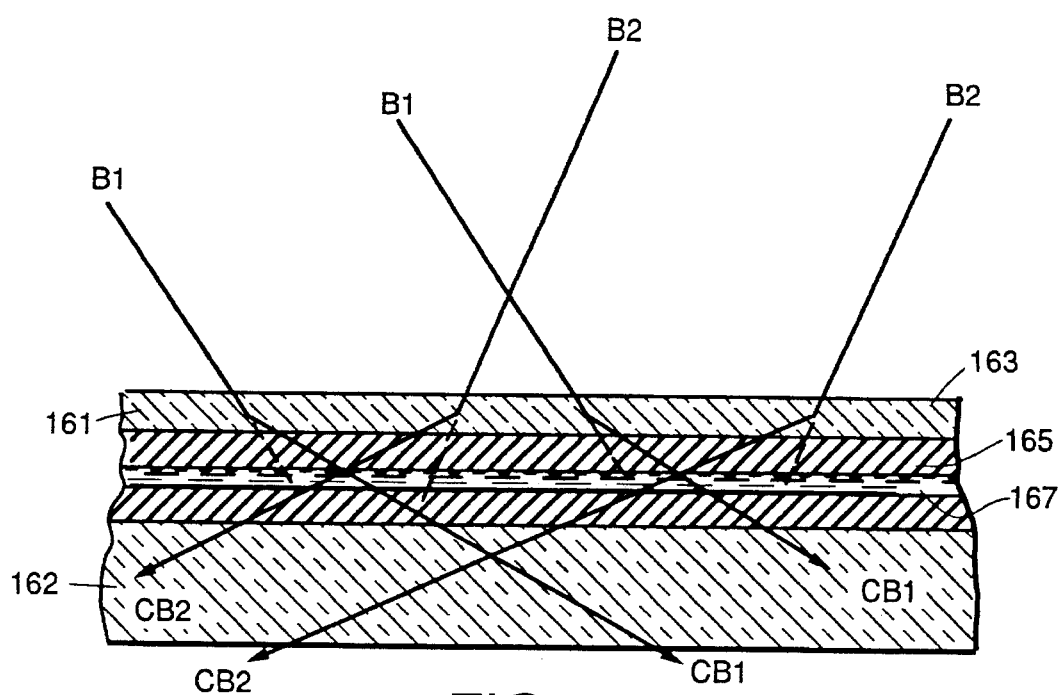
FIG. 3 schematically depicts a hologram exposure system in accordance with the invention which includes two holographic prisms formed in a single hologram layer.

Referring now to FIG. 3, set forth therein is a further illustrative implementation of an exposure system in accordance with the invention which includes two holographic prisms formed in a single hologram layer and two holographic zero order filters formed in a single hologram layer. The exposure system includes a hologram recording medium 161 which is supported by a substrate 162, a laminar structure comprised of a holographic prism layer 163 and a holographic zero order filter layer 165, and an index matching fluid layer 167 for index matching the holographic recording medium 161 to the laminar structure comprised of the holographic prism layer 163 and the hologram layer 165. The holographic prism layer 163 contains first and second holographic prisms, while the holographic zero order filter layer 165 contains first and second holographic zero order filters. The exposure system of FIG. 3 operates similarly to the hologram exposure system of FIG. 2, except that first and second monochromatic beams B1, B2 are respectively diffracted by first and second holographic prisms in a single holographic prism layer 163, and the undiffracted portions of the monochromatic beams B1, B2, schematically depicted in FIG. 3 by broken lines, are diffracted away from the holographic recording medium 161 by respective first and second zero order filter holograms formed in a single zero order filter hologram layer 165.

Figure 4:
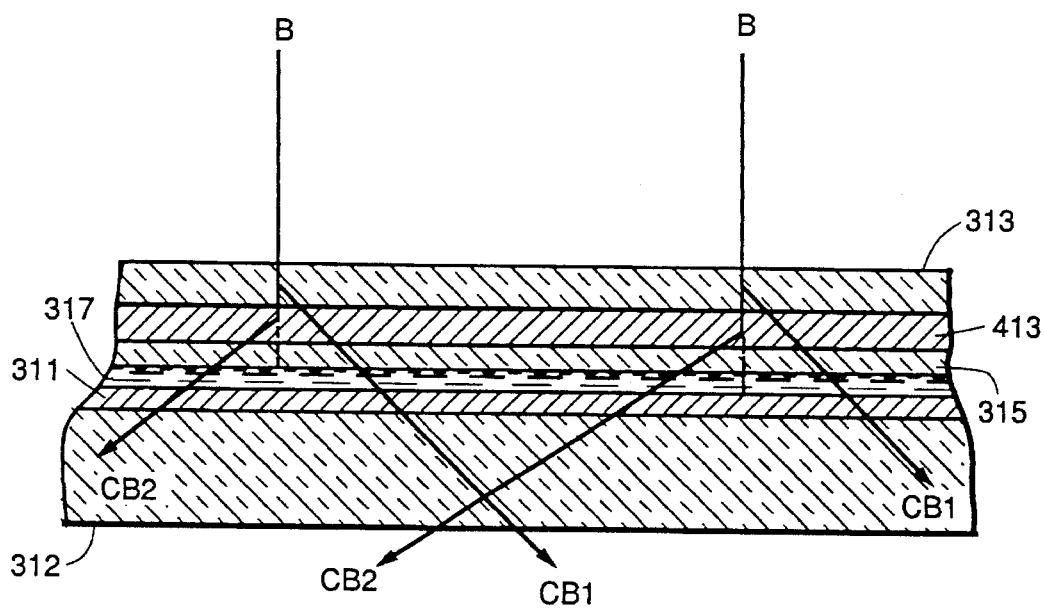
FIG. 4 schematically depicts another hologram exposure system in accordance with the invention.

Referring now to FIG. 4, set forth therein is a further implementation of an exposure system in accordance with the invention wherein single beam is diffracted by two holographic prisms to form two hologram forming construction beams. The exposure system includes a hologram recording medium 311 which is supported by a substrate 312, a laminar structure comprised of a first holographic prism 313, a second holographic prism 413 and a holographic zero order filter 315 which are laminated together, and an index matching fluid layer 317 for index matching the laminar structure comprised of the holographic prisms and the holographic zero order filter to the holographic recording medium 311. More particularly, the layers of the laminar structure are in the following order, starting with the layer that is furthest from the index matching fluid layer 317: the first holographic prism 313, the second holographic prism 413, and the holographic zero order filter 315. The first and second holographic prisms 313, 213 and the holographic zero order filter 315 can be non-laminated and index matched to each other by respective intervening index matching fluid layers.

As shown in FIG. 4, the first holographic prism 313 comprises a transmission hologram which is tuned to diffract only a portion of a monochromatic beam B of a predetermined wavelength and incidence angle that satisfies the Bragg condition thereof at a predetermined diffraction angle that corresponds to the desired angle at which a first construction beam is to be coupled into the hologram recording medium 311, and to transmit a substantial portion of such light without any diffraction. For example, the first holographic prism 313 is about 50 percent efficient, such that it diffracts about one-half of a beam that satisfies the Bragg condition thereof, and thus transmits without any diffraction about one-half of the beam that satisfies the Bragg condition. The second holographic prism 413 comprises a narrow angular bandwidth transmission hologram that is tuned to substantially the same Bragg condition as the first holographic prism and to be as efficient as practicable, so as to maximize the light diffracted thereby. Also, second holographic prism 413 diffracts light at a different diffraction angle than the first holographic prism, and such diffraction angle corresponds to the desired angle at which a second construction beam is to be coupled into the hologram recording medium 311. The first and second holographic prisms are further tuned such that the diffracted beam produced by the first holographic prism is outside the angular bandwidth of the second holographic prism so that such diffracted beam is transmitted by the second holographic prism without any diffraction.

Preferably, the second holographic prism 413 is constructed to have a relatively narrow angular bandwidth, so as to minimize diffraction of the beam diffracted by the first holographic prism. Also, the second holographic prism 413 is preferably constructed to have an efficiency that is as high as practicable so as to maximize the diffracted construction illumination that is coupled into the hologram recording material. In regard to having a relatively narrow angular bandwidth and high efficiency, the second holographic prism 313 can have thickness in the range of about 20 to 40 microns.

Since the monochromatic beam B meets the Bragg condition for the first holographic prism 313, the first holographic prism diffracts the first monochromatic beam to produce a first construction beam CB1 which pursuant to the invention can be at a relatively high angle relative to normal to the hologram recording medium 311. Since the first holographic prism 313 is relatively inefficient, it transmits a portion of the monochromatic beam B without any diffraction to produce a non-diffracted transmitted beam. Since the non-diffracted beam transmitted by the first holographic prism 313 meets the Bragg condition for the second holographic prism 413, the second holographic prism diffracts the non-diffracted transmitted beam to produce a second construction beam CB2 which pursuant to the invention can be at a relatively high angle relative to normal to the hologram recording medium 311. Since the first diffracted construction beam CB1 is not within the angular bandwidth of the second holographic prism 413, the second holographic prism transmits the first construction beam CB1 without any diffraction.

The holographic zero order filter 315 is configured to transmit without any diffraction the construction beams CB1, CB2, which accordingly pass through the holographic zero order filter 315 without any diffraction and through the index matching fluid layer 317 into the hologram recording medium 311 where they interfere to form hologram fringes.

The holographic zero order filter 315 is further configured to diffract away from the hologram recording medium the portion of the beam B that is transmitted without any diffraction by both first and second holographic prism 313, 413, particularly at a diffraction angle that insures that the light diffracted thereby is not re-directed toward the holographic recording medium as a result of subsequent diffractions by the one or more of the holographic elements in the hologram exposure system, and by way of illustrative example comprises a reflection hologram. Thus, the holographic zero order filter 315 is constructed to have the same Bragg conditions as the first and second holographic prisms 313, 413, except that the holographic zero order filter 315 diffracts the transmitted, non-diffracted zero order portion of the beam B, schematically depicted in FIG. 4 by broken lines, away from the hologram recording medium at an angle that insures that the light diffracted thereby is not re-directed toward the holographic recording medium as a result of subsequent diffractions by the one or more of the holographic elements in the hologram exposure system. Moreover, the angular bandwidth of the holographic zero order filter 315 is configured such that the first and second construction beams CB1, CB2 are outside of the angular bandwidth of the holographic zero order filter 315. By way of particular example, the holographic zero order filter 315 is configured to diffract the transmitted, non-diffracted zero order portion of the beam B back through the second and first holographic prisms 413,313. Alternatively, the holographic zero order filter 315 is configured to diffract the transmitted, non-diffracted portion of the beam B through the holographic zero order filter 315 so that the diffracted light exits at an edge of the holographic zero order filter 315.

While the foregoing specific implementations of the invention have included holographic zero order filters for preventing zero order light from reaching the holographic recording medium, it should be appreciated that other structures can be utilized to provide such zero order filtering.

The foregoing has been a disclosure of a hologram exposure system that efficiently couples construction illumination to a holographic recording medium without the use of refractive prisms.

Although the foregoing has been a description and illustration of specific embodiments of the invention, various modifications and changes thereto can be made by persons skilled in the art without departing from the scope and spirit of the invention as defined by the following claims.

What is claimed is:

1. A hologram exposure system comprising:

a holographic recording medium;

a first monochromatic beam having a predetermined wavelength and a first predetermined direction;

a second monochromatic beam having said predetermined wavelength and a predetermined direction that is different from said first predetermined direction;

a hologram layer from diffracting said first monochromatic beam toward one side of said holographic recording medium to produce a diffracted beam and for transmitting said second monochromatic beam toward said one side of said holographic recording medium without diffraction to produce a non-diffracted beam; and a holographic zero order filter interposed between said hologram layer and said holographic recording material for diffracting a portion of said first monochromatic beam that is not diffracted by said hologram layer, said holographic zero order filter diffracting said portion of said first monochromatic beam away from said holographic recording medium;

whereby said diffracted beam and said non-diffracted beam interfere in said hologram recording medium to form holographic fringes.

2. The hologram exposure system of claim 1 wherein said hologram layer has a thickness in range of about 20 to 40 microns.

3. A hologram exposure system comprising:

a holographic recording medium;

a first monochromatic beam having a predetermined wavelength and a first predetermined direction;

a second monochromatic beam having said predetermined wavelength and a predetermined direction that is different from said first predetermined direction;

a first hologram for diffracting said first monochromatic beam toward said holographic recording medium to produce a first diffracted beam and for transmitting said second monochromatic beam toward said holographic recording medium without diffraction to produce a transmitted second monochromatic beam; and a second hologram located between said first hologram and said holographic recording medium for diffracting said transmitted second monochromatic beam toward said holographic recording medium to produce a second diffracted beam and for transmitting said first diffracted beam to said holographic recording medium without diffraction;

whereby said first and second diffracted beams interfere in said hologram recording medium to form holographic fringes.

4. The hologram exposure system of claim 3 wherein said first and second holograms are formed in a single hologram layer.

5. The hologram exposure system of claim 3 further including a holographic zero order filter interposed between said first hologram and said holographic recording material for diffracting a portion of said first monochromatic beam that is not diffracted by said first hologram, said holographic zero order filter diffracting said portion of said first monochromatic beam away from said holographic recording medium.

6. The hologram exposure system of claim 5 further including a holographic zero order filter interposed between said second hologram and said holographic recording material for diffracting a portion of said transmitted second monochromatic beam that is not diffracted by said second hologram, said holographic zero order filter diffracting said portion of said transmitted second monochromatic beam away from said holographic recording medium.

7. The hologram exposure system of claim 3 further comprising:

a first holographic zero order filter interposed between said first hologram and said holographic recording material for diffracting a portion of said first monochromatic beam that is not diffracted by said first hologram, said holographic zero order filter diffracting said portion of said first monochromatic beam away from said holographic recording medium; and a second holographic zero order filter interposed between said second hologram and said holographic recording material for diffracting a portion of said transmitted second monochromatic beam that is not diffracted by said second hologram, said holographic zero order filter diffracting said portion of said transmitted second monochromatic beam away from said holographic recording medium.

8. The hologram exposure system of claim 7 wherein said first and second holograms are formed in a single hologram layer.

9. The hologram exposure system of claim 3 wherein said first and second holograms are respectively formed in first and second hologram layers, each of said first and second hologram layers having a thickness in range of about 20 to 40 microns.

10. A hologram exposure system comprising:

a holographic recording medium;

a monochromatic beam having a predetermined wavelength and a predetermined direction;

a first hologram for diffracting a first portion of said first monochromatic beam toward said holographic recording medium to produce a first diffracted beam and for transmitting a portion of said first monochromatic beam toward said holographic recording medium without diffraction to produce a non-diffracted beam; and a second hologram located between said first hologram and said holographic recording medium for diffracting said non-diffracted beam toward said holographic recording medium to produce a second diffracted beam and for transmitting said first diffracted beam to said holographic recording medium without diffraction;

whereby said first and second diffracted beams interfere in said hologram recording medium to form holographic fringes.

11. The hologram exposure system of claim 10 further including a holographic zero order filter interposed between said second hologram and said holographic recording material for diffracting a portion of said non-diffracted beam that is not diffracted by said second hologram.

12. The hologram exposure system of claim 10 wherein said first and second holograms are respectively formed in first and second hologram layers, each of said first and second hologram layers having a thickness in range of about 20 to 40 microns.

\* \* \* \* \*